(12) United States Patent
Oren et al.

(10) Patent No.: US 8,585,341 B1
(45) Date of Patent: Nov. 19, 2013

(54) PROPPANT DISCHARGE SYSTEM AND A CONTAINER FOR USE IN SUCH A PROPPANT DISCHARGE SYSTEM

(71) Applicants: John Oren, Houston, TX (US); Joshua Oren, Houston, TX (US)

(72) Inventors: John Oren, Houston, TX (US); Joshua Oren, Houston, TX (US)

(*) Notice: Subject to any disclaimer, the term of this patent is extended or adjusted under 35 U.S.C. 154(b) by 0 days.

(21) Appl. No.: 13/660,866

(22) Filed: Oct. 25, 2012

Related U.S. Application Data

(63) Continuation of application No. 13/628,702, filed on Sep. 27, 2012, which is a continuation-in-part of application No. 13/555,653, filed on Jul. 23, 2012.

(51) Int. Cl.
*B65G 65/40* (2006.01)

(52) U.S. Cl.
USPC ......... 414/411; 414/407; 414/528; 222/181.1

(58) Field of Classification Search
USPC ......... 414/502–505, 518, 528, 406, 407, 411; 166/79.1, 75.15; 222/163, 181.1; 221/174
See application file for complete search history.

(56) References Cited

U.S. PATENT DOCUMENTS

| | | | | |
|---|---|---|---|---|
| 1,850,000 A | * | 3/1932 | Dauteuil | 221/173 |
| 3,986,708 A | * | 10/1976 | Heltzel et al. | 366/17 |
| 4,919,583 A | * | 4/1990 | Speakman, Jr. | 414/528 |
| 6,120,233 A | * | 9/2000 | Adam | 414/502 |
| 6,155,175 A | * | 12/2000 | Rude et al. | 104/17.1 |
| 7,252,309 B2 | * | 8/2007 | Eng Soon et al. | 222/185.1 |
| 7,316,333 B2 | * | 1/2008 | Wegner | 222/181.1 |
| 2006/0180062 A1 | * | 8/2006 | Furrer et al. | 111/171 |

* cited by examiner

*Primary Examiner* — Jonathan Snelting
(74) *Attorney, Agent, or Firm* — Egbert Law Offices, PLLC

(57) ABSTRACT

A proppant discharge system has a container with an outlet formed at a bottom thereof and a gate slidably affixed at the outlet so as to be movable between a first position covering the outlet to a second position opening the outlet, and a support structure having an actuator thereon. The container is removably positioned on the top surface of the support structure. The actuator is engageable with gate so as to move the gate from the first position to the second position. A conveyor underlies the container so as to receive proppant as discharged from the container through the outlet. The container is a ten foot ISO container.

9 Claims, 5 Drawing Sheets

PROPPANT DISCHARGE SYSTEM AND A CONTAINER FOR USE IN SUCH A PROPPANT DISCHARGE SYSTEM

CROSS-REFERENCE TO RELATED APPLICATIONS

The present invention is a continuation of U.S. application Ser. No. 13/628,702, filed on Sep. 27, 2012, and entitled "Proppant Discharge System and a Container for Use in Such a Proppant Discharge System", presently pending. U.S. application Ser. No. 13/628,702 is a continuation-in-part of U.S. application Ser. No. 13/555,635, filed on Jul. 23, 2012, and entitled "Proppant Discharge System Having a Container and the Process for Providing Proppant to a Well Site", presently pending.

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

INCORPORATION-BY-REFERENCE OF MATERIALS SUBMITTED ON A COMPACT DISC

Not applicable.

BACKGROUND OF THE INVENTION

1. Field of the Invention

The present invention relates to storage containers. More particularly, the present invention the relates to proppant discharge systems wherein proppant can be discharged from the storage container. Additionally, the present invention relates to a process for providing proppant to a well site by the transport and delivery of the proppant containers.

2. Description of Related Art Including Information Disclosed Under 37 CFR 1.97 and 37 CFR 1.98.

Hydraulic fracturing is the propagation of fractions in a rock layer caused by the presence of pressurized fluid. Hydraulic fractures may form naturally, in the case of veins or dikes, or may be man-made in order to release petroleum, natural gas, coal seam gas, or other substances for extraction. Fracturing is done from a wellbore drilled into reservoir rock formations. The energy from the injection of a highly-pressurized fracking fluid creates new channels in the rock which can increase the extraction rates and ultimate recovery of fossil fuels. The fracture width is typically maintained after the injection by introducing a proppant into the injected fluid. Proppant is a material, such as grains of sand, ceramic, or other particulates, that prevent the fractures from closing when the injection is stopped.

With the rise of hydraulic fracturing over the past decade, there is a steep climb in proppant demand. Global supplies are currently tight. The number of proppant suppliers worldwide has increased since 2000 from a handful to well over fifty sand, ceramic proppant and resin-coat producers.

By the far the dominant proppant is silica sand, made up of ancient weathered quartz, the most common mineral in the Earth's continental crust. Unlike common sand, which often feels gritty when rubbed between the fingers, sand used as a proppant tends to roll to the touch as a result of its round, spherical shape and tightly-graded particle distribution. Sand quality is a function of both deposit and processing. Grain size is critical, as any given proppant must reliably fall within certain mesh ranges, subject to downhole conditions and completion design. Generally, coarser proppant allows the higher flow capacity due to the larger pore spaces between grains. However, it may break down or crush more readily under stress due to the relatively fewer grain-to-grain contact points to bear the stress often incurred in deep oil and gas-bearing formations.

Typically, in any hydraulic fracturing operation, a large amount of such proppant is required. Typically, it has been difficult to effectively store the proppant at the fracturing sites. Additionally, it has been found to be rather difficult to effectively transport the proppant to the desired location. Often, proppant is hauled to the desired locations on the back of trucks and is dumped onsite. Under such circumstances, the proppant is often exposed to adverse weather conditions. This will effectively degrade the quality of the proppant during its storage. Additionally, the maintenance of proppant in containers at the hydraulic fracturing site requires a large capital investment in storage facilities. Typically, the unloading of such storage facilities is carried out on a facility-by-facility basis. As such, there is a need to be able to effectively transport the proppant to and store the proppant in a desired location adjacent to the hydraulic fracturing location.

With the development and acceptance of the well stimulation methodology known as "hydraulic fracturing", a unique logistics challenge has been created in delivering the massive quantities of proppant from domestic sand mines to the wellhead. This logistics challenge affects every stakeholder up-and-down the logistics chain. In particular, this includes sand mine owners, railroads, trans-loading facilities, oil-field service companies, trucking companies and exploration and production companies. The existing method of delivering sand to the consumer requires the use of expensive specialized equipment and a high level of coordination. This makes the process subject to a myriad of problems that disrupt the efficient flow of proppant to the wellhead. The result of utilizing the current method is the expenditure of hundreds of millions of dollars in largely unnecessary logistics costs.

Sand mines are being rapidly developed all over the United States to satisfy the demand that the "Shale Boom" has created for proppant. Most of the recent mines that have come on-line, or are in varying stages of development, have limited transportation infrastructure to support the export of sand from the sand-pit. As a result, many mines are building rail-spurs that will accommodate tip to 100 rail cars or more that can be loaded and staged for transportation to the designated destination. Along with rail-track, these companies are also investing in expensive vertical silo storage facilities to store thousands of tons of proppant. The sand mines are unable to effectively ship proppant to the shale regions without equal fluid trans-loading and storage facilities on the receiving end of the logistics chain. This results in lost revenue and productivity for the mine owner and higher prices for proppant buyers in the destination region.

Railroads are a critical part of the logistics chain required to move proppant from mine to the various shale regions. Due to the lack of rail track and trans-loading facilities in some of these remote regions, the railroad companies must be selective of their customers' delivery locations, and make sure that their customers have the ability to efficiently off-load rail cars. Recently, the railroads have seen the allocated fleet of hopper cars being stranded at those destination where there is no cost-effective storage option to efficiently off-load those cars. Consequently, there has been a significant opportunity cost that the railroads have been forced to pay. As such, a need has developed, for facilitating the ability to quickly and inexpensively off-load proppant from rail cars so as to enable the railroads to improve the velocity, turn-around and revenue-generating capacity of the rail-car fleet.

Limited storage at trans-loading facilities has severely limited many of the current facilities' ability to operate efficiently. Most trans-load facilities are forced to off-load rail hopper cars by bringing in trucks (i.e. pneumatics) along the rail siding, and conveying sand directly from rail to truck. This requires an intense coordination effort on the part of the trans-loader as well as the trucking community. Long truck lines are commonplace, and demurrage fees (i.e. waiting time charged by trucking companies) amount to hundreds of millions of dollars nationwide. As such, the trans-loader is not able to fully realize the utilization of conveying and other material handling equipment. The throughput of these trans-loading terminals severely reduces costing of the terminal meaningful revenue.

Additionally, optimal trans-load terminal locations are immobile and not able to move from one area of the shale pay to another. Investors in immobile silo and flat storage facilities can see the utilization and value of those investments tumble. A potential loss of the investment in such immobile silos can often scare investment capital away from these types of future projects so as to further exacerbate the logistics chain problem. As such, a need has developed for a portable, inexpensive storage and delivery solution for proppant that would help revive the capital needed to improve the facilities and maximize the revenue-generating potential of existing and new trans-load and storage facilities.

The lack of efficient trans-load and storage facilities in shale regions have taken a heavy toll on the efficiencies of trucking fleets. While trucking companies have typically charged demurrage fees to compensate for the waiting time and lost productivity, those types of charges are under significant resistance from the customer base. When trucking companies are required to wait in line to be loaded, or wait at a well-site to be unloaded, the number of turns that the equipment can make in a day is severely limited. Rather than turning two or three loads in a single day, the trucks more typically make one trip per day, and very commonly may make one delivery every two or three days. This lack of efficient fleet utilization results in the trucking company having to buy more equipment and hire more drivers to move the same amount of material than would be necessary. As such, it would be desirable to eliminate demurrage charges and to present the opportunity for trucking companies to become more profitable while making smaller investments in equipment.

Service companies (such as fracturing companies) are held captive by the current proppant delivery process. This is the result of inefficient trans-load facilities and pneumatic (bulk) truck deliveries. The service company cannot frac a well if it does not have a supply of proppant. It is widely known that the problems surrounding the efficient delivery of proppant to the well-site is one of the primary challenges to the service companies in successfully completing a frac job. Pressure pumps, coiled tubing and other well stimulation equipment, often site idle due to the lack of required proppant at the well-site. "Screening-Out" or running out of proppant is very common at well locations due to the lack of control over what is happening up-stream in the proppant logistics chain. This results in lower profit margins to the service company. Many small to medium-sized hydraulic fracturing companies have little or no logistics infrastructure. Some have entered the marketplace without much thought to the logistics problems associated with taking delivery of the necessary supplies to complete a well. In doing so, many of these companies have been forced to source material and employ very expensive logistics options in order to survive. This has resulted in above-market pricing in order to complete wells. There is also a risk of losing out on otherwise viable hydraulic fracturing contracts. As such, there is a need to lower costs across the board in order to properly compete.

Exploration and production companies, along with the entire U.S. population, pay the ultimate bill for all of the inefficiencies and waste that plagues the proppant supply chain. Service companies are forced to price hydraulic fracturing services by taking into account the historical costs of supply chain problems. Exploration and production companies need to pass on the overall increased cost of production. As such, there is a need to provide a cost-effective solution to improve the profitability of stake holders in the proppant logistics chain, while lowering the overall cost to the consumer.

U.S. patent application Ser. No. 13/427,140, filed on Mar. 22, 2012 by the present inventor, describes a system for the delivery of proppant between a loading station and the well site. This application describes the steps of placing the storage container in a location adjacent to a train site such that the proppant, as delivered by the train, can be discharged into the container. The container can then be transported for storage in stacks at the loading area or can be delivered to a tilting mechanism at the loading station. The tilting station will tilt the container so as to allow the proppant to flow outwardly therefrom. This proppant will flow, by a conveyor, to a pneumatic truck. The truck can then transport the proppant over the highways to the well site. At the well site, the proppant from the pneumatic truck can then be discharged into a twenty foot container at the well site. These twenty foot containers can be stored at the well site in a stacked configuration. Ultimately, each of the containers can be transported to another tilting mechanism at the well site so that the proppant within each of the storage containers can be discharged onto a conveyor and ultimately for use during the fracturing operation.

In this U.S. patent application Ser. No. 13/427,140, the twenty-foot ISO container that is utilized is one of the most inexpensive and readily-available pieces of transportation equipment in the world. It was determined that the use of the twenty-foot container allows for the transportation of proppant through various minor modifications to the internal walls and reinforcements of the twenty-foot ISO container. The available capacity is more than acceptable. It was determined that this modified twenty-foot container could hold in excess of forty-five tons of proppant. The cost of an unmodified twenty-foot ISO container is less than four thousand dollars. This makes it very affordable compared to the cost of building vertical silos or flat storage buildings.

The twenty-foot ISO container was modified by cutting a hole in the top of the container and constructing a water-tight, hinged hatch through which the proppant could be poured by any number of readily-available conveying units. There was also a lower hatch in the twenty-foot ISO container. This lower hatch could be opened to drain the proppant out of the twenty-foot ISO container. Alternatively, a square flow-gate was fabricated and welded to the vertical rear lower side of the twenty-foot container. This gate hatch allowed the container to be tilted in the manner of a dump truck bed. As a result, sand could flow out of the flow gate while moderating the flow of the sand.

This patent application provided the ability to trans-load sand via containers from a standard rail hopper car to the twenty-foot ISO container. It was determined that the container could be loaded in less than twenty minutes with at least forty-five tons of proppant. By pre-positioning the container along the rail track, movable conveyors could work the train from one end to the other and unload the train in a very efficient and timely manner. This part of the process eliminated the coordination efforts of calling in pneumatic trucks that could be systematically loaded by conveying units. This reduced the time necessary to unload a train's hopper cars by many hours. It also eliminated truck traffic and demurrage charges at the rail-spur and trans-load facility.

Once the proppant is loaded into the container, another piece of specialized equipment would be used to lift the full container and to stack the container upon other containers. The stackable arrangement of containers allows the ability to operate and store proppant within a very small footprint. The specialized equipment that was required to lift the full containers was so heavy and large that it would have to be disassembled into several pieces before moving from one location to another. This created some limitations on the flexibility that such equipment lent to the containerized process.

By "containerizing" proppant, it was found that an inventory management system could be added in order to provide real-time, accurate information pertaining to the volume/inventory of proppant that the customers own in a particular region. Currently, many proppant buyers are subject to in accurate volume reporting from trans-loading facilities. As such, they may not be certain that the proppant being delivered to the well-site is, in fact, of the quality and grade that they have purchased. By applying an inventory management system, bar coding, and scanning the containers into and out of inventory, the customers would be assured that they have received their proppant and would be able streamline the procurement process when ordering more material.

In this prior process, since the twenty-foot ISO container needed to be emptied and trans-loaded into pneumatic trailers for delivery to the wellhead, a tilting unit was incorporated into the process. This tilting unit accepted the twenty-foot ISO containers. The tilting unit is able to lift one end of the container and create the required angle to wholly empty the container through the flow gate. Once tilted, the sand would spill onto the belt of the conveyor and rise vertically into a hopper. The hopper rested on a steel fabrication stand. This stand is high enough such that a truck that pulls a pneumatic trailer could drive under the stand and be gravity fed by the hopper so as to fill up the sand trailer. These "loading stations" could be replicated along a path so as to alleviate the bottleneck of trucks at a trans-load facility that has a limited number of conveyors available to load the trucks. Once again, trucking demurrage at this trans-load facility could be dramatically reduced through the process. The railcars can be off-loaded rapidly and released back to the railroads. This also reduced or eliminated demurrage fees charged by the railroads for rail hopper cars that stood waiting to be off-loaded.

This prior process created an inexpensive storage solution, improved the efficiencies of the trans-loading process, added inventory visibility and controls, and reduced both truck and rail demurrage charges. However, it did have several limitations. For example, the twenty-foot ISO container, while capable of handling ninety thousand pounds of proppant, could not be transported legally over a public road. In most states, the maximum allowable total weight of a vehicle and its payload is eighty thousand pounds of gross vehicle weight in order to be considered a legal load. By law, any load that can be broken down by two units or more, in order to achieve a legal weight limit, must be divided into multiple loads. Since proppant is divisible, the law does not allow for heavy or over-weight loads.

The angle of repose of a granular material is the steepest angle of descent or dip of the slope relative to the horizontal plane when material on the slope face is on the verge of sliding. When bulk granular materials are poured onto a horizontal surface, a conical pile will form. The internal angle between the surface of the pile and the horizontal surface is known as the angle of repose and is related to the density, surface area and shape of the particles, and the coefficient of friction of the material. The angle of repose is also gravity-dependent.

When analyzing the angle of repose of proppant poured into a twenty-foot ISO container, it was evident that much of the volume of such a container was void. Specifically, the upper ends of twenty-foot ISO container could not be utilized without somehow manipulating or tilting the container as it was filled by a conveyor. Moreover, when emptying the container, by way of the original bottom hatch, the proppant would pour directly out of the bottom and leave a significant amount of material sitting on the floor of the container.

U.S. patent application Ser. No. 13/555,635, filed on Jul. 23, 2012 by the present inventor, is the parent of the present application. U.S. patent application Ser. No. 13/555,635 described a new generation of the container by taking the original twenty-foot ISO container and splitting it in half. As such, a ten foot ISO container was provided. By breaking the container into a ten foot configuration, it was determined that such a container could hold approximately 45,000-48,000 pounds of proppant. More importantly, the total gross vehicle weight of such a fully-loaded container could be legally transported over a public road. This was a major breakthrough. The container could be delivered to the wellhead in advance of a frac crew and eliminate sand deliveries during the fracturing process. Because all of the required proppant for any frac job could be delivered and stored on-site, such a ten-foot ISO container effectively eliminated the occurrence of trucking demurrage charges at the well-site. Also, the use of such a ten-foot container effectively eliminated the problems caused by the angle of repose of the proppant and allowed the volumetric capacity of such a ten-foot ISO container to be more fully utilized. It was found to be the optimal configuration, size, and cost for the process.

This prior application utilized, an insert that is fabricated and welded within the interior of the ten-foot ISO container. The insert allowed the proppant, loaded through the top hatch, to fully flow out of a newly designed bottom flow-gate. The need to manipulate or tilt the container was eliminated. This ten-foot container could now be filled and emptied by using only gravity to do so.

In the past, various patents have issued relating to storage and transport facilities. For example, U.S. Patent Publication No. 2008/0179054, published on Jul. 31, 2008 to McGough et al., shows a bulk material storage and transportation system. In particular, the storage system is mounted on the trailer of a track. The storage system includes walls that define an interior volume suitable for receiving the aggregate material therein. There are hoppers provided at the bottom of the container. These hoppers have inclined walls. The hoppers can extend so as to allow the material from the inside of the container to be properly conveyed to a location exterior of the container. Actuators are used so as to expand and collapse the container.

U.S. Pat. No. 7,240,681, issued on Jul. 10, 2007 to L. Saik, describes a trailer-mounted mobile apparatus for dewatering and recovering formation sand. The trailer is mounted to a truck-towable trailer so as to receive sand therein. The container has a pair of sloping end walls. The back end of the container is suitably openable so as to allow the sand to be removed therefrom. A pneumatic or hydraulic ram is provided on the forward part of the container so as to allow the container to be lifted angularly upwardly so as to al low sand to be discharged through the gate at the rear of the container.

U.S. Pat. No. 4,247,228, issued on Jan. 27, 1981 to Gray et al., describes a dump truck or trailer with a pneumatic conveyor. The container is mounted to a frame on wheels. A hydraulic ram tilts the container for dumping through a rear outlet. A pneumatic conveyor is carried by the frame with an intake at the rear of the container. A gate allows the solids to be dumped conventionally by gravity or to be blown to a storage facility by the pneumatic container. The container has a top hatch formed therein so as to allow the solids to be introduced into the interior of the container.

U.S. Pat. No. 2,865,521, issued on Dec. 23, 1958 to Fisher et al., shows a bulk material truck that has an interior volume suitable for the receipt of bulk material therein. A pneumatic conveyer is utilized so as to allow the removal of such material from the bottom of the container. A pair of sloping walls are provided on opposite sides of the container so as to allow the bulk material within the container to be passed toward the bottom of the container. A top hatch is provided on the top of the conveyer. The pneumatic conveyer is connected to the bottom of the container.

It is an object of the present invention to provide a proppant storage container that allows proppant to be easily transported and stored.

It is another object of the present invention to provide a proppant storage container that allows the proppant to be easily and efficiently discharged to the bottom of the container.

It is another object of the present invention to provide a proppant storage container which allows for the effective storage of proppant at the fracturing site.

It is another object of the present invention to provide a process for delivering proppants that eliminates the use of pneumatic trailers.

It is further object of the present invention to provide a proppant storage container and a process for delivering proppant in which of the containers can be moved by a simple forklift.

It is another object of the present invention to provide a process for delivering proppants which effectively eliminates demurrage associated with the loading station and at the well site.

It is a further object of the present invention to provide a process of the deliver proppant which avoids the degradation of the proppant as a result of repeated handling.

It is a further object of the present invention to provide a proppant discharge system which provides a premeasured amount of proppant to the drill site.

It is still another object of the present invention to provide a proppant container which satisfies highway regulation and which has less void space within the interior of the container.

These and other objects and advantages of the present invention will become apparent from a reading of the attached specification and appended claims.

BRIEF SUMMARY OF THE INVENTION

The present invention is a container for the transport and storage of proppant. The container comprises a box having a bottom, a pair of side walls, a pair of end walls and a top. The box has an inlet formed at or adjacent to the top. The box has a outlet at the bottom. A gate is positioned at the outlet. The gate is slidably movable between a first position covering the outlet and a second position opening the outlet.

A first ramp extends from one of the pair of sidewalls to the outlet. A second ramp extends from the other of the pair of sidewalls to the outlet. A third ramp extends from one pair of end walls to the outlet. A fourth ramp extends from the other of the pair of end walls to the outlet. The box has a track formed on the bottom thereof. The gate is positioned in the track. The gate has a pin extending outwardly therefrom. The box has a frame formed on an exterior thereof. The frame extends across the pair of sidewalls and the pair of end walls. The ramps have exterior surfaces exposed through the frame. The box has a capacity of up to 48,000 pounds of the proppant. The box is a ten-foot ISO container.

The present invention is also a proppant discharge system that has a container with a pair of sidewalls, a pair of end walls, a bottom and a top. The container has an inlet formed at or adjacent to the top. The container has an outlet formed at the bottom thereof. A gate is slidably affixed at the outlet of the container so to be movable between a first position covering the outlet and a second position opening the outlet. A support structure has a top surface and at least one actuator. The container is removably positioned on the top surface of the support structure. The actuator is engageable with the gate so as to move the gate from the first position to the second position.

In particular, the gate has a pin extending therefrom. The actuator has a receptacle. The pin is receivable within the receptacle.

A conveyor underlies the top surface of the support structure so as to receive proppant as discharged from the container through the outlet of the container. A hopper is positioned on the support structure below the top surface thereof. The hopper is positioned directly below the gate of the container. The hopper has an opening at a bottom thereof. The bottom of the hopper is positioned above the conveyor. A metering gate is positioned adjacent to the opening at the bottom of the hopper metering gate. The metering gate is movable between a closed position and an open position. The opening at the bottom of the hopper has a plurality of slots formed therein. The metering gate also has a plurality of slots formed therethrough. The plurality of slots of the metering gate are at least partially aligned with the plurality of slots of the hopper when the metering gate is in the open position. The opening at the bottom of the hopper has an inverted V-shape configuration. The metering gate has an inverted V-shaped configuration matching with the opening at the bottom of the hopper. The metering gate is slidable relative to the opening at the bottom of the hopper. An actuator affixed to the metering gate so as to move the metering gate between the closed position and the open position.

A frame is affixed, to the conveyor and extends therealong. A discharge chute is connected to the frame and is cooperative with the end of the conveyor so as to discharge the proppant from the conveyor to a desired location. A plurality of wheels can be rotatably mounted to the frame so as to allow the conveyor to be transported to the desired location.

The present invention is also a process for delivering proppant to a fracturing site. This process includes the steps of: (1) forming a container having an interior suitable for receiving the proppant therein and having an outlet at a bottom thereof; (2) filling the container with the proppant; (3) moving the filled container along a roadway to the fracturing site; (4) placing the filled container upon a conveyor structure; (5) discharging the proppant from the outlet of the container onto the conveyor; and (6) conveying the discharged proppant to a desired location at the fracturing site.

In this process of present invention, the step of forming includes forming the container so as to have a length of approximately ten feet. A gate is placed over the outlet of the container. The gate is movable between a first position closing the outlet and a second position opening the outlet. The conveyor structure has an actuator thereon. This actuator is connected to a receptacle. The gate has a pin extending outwardly therefrom. The pin is positioned into the receptacle of the actuator and the actuator is actuated so as to move the gate from the first position to the second position. The conveyor structure has a hopper is positioned below a top surface thereof. The hopper has a metering gate at a bottom thereof. The metering gate is positioned above the conveyor of the conveyor structure. The filled container is positioned directly above the hopper of the conveyor structure. The proppant is discharged from the outlet of the container into the hopper of the conveyor structure. The proppant is metered through the metering gate at a control flow rate so as to be discharged therefrom onto the conveyor.

The process of the present invention further includes the steps of placing the filled container upon a train, transporting the filled container on the train to a location, removing the filled container from the train, and placing the removed filled container onto a vehicle.

This foregoing section is intended to describe, with particularity, the preferred embodiments of the present invention. It is understood that modifications to these preferred embodiments can be made within the scope of the present invention. As such, this section should not be construed, in any way, as limiting of the true scope of the present invention. The present invention should only be limited by the following claims and their legal equivalents.

DETAILED DESCRIPTION OF THE INVENTION

Figure 1:
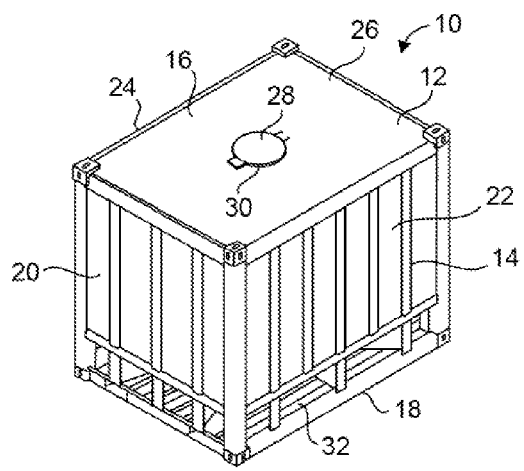
FIG. 1 is a perspective view of the container in accordance with the preferred embodiment of the present invention.

Referring to FIG. 1, there is shown the container 10 in accordance with the preferred embodiment of the present invention. The container 10 is in the nature of a box 12 having an exterior frame 14. The box 12 includes a top 16, a bottom 18, an end wall 20 and a side wall 22. The side wall 24 is opposite to the side wall 22. There also an end wall 26 that is opposite to that of end wall 20. An inlet 28 is formed through the top 16 of the box 12. A hatch 30 is removably or hingedly affixed over the inlet 28 so as to allow proppant to be introduced into the interior volume of the container 10.

In FIG. 1, it can be seen that the frame 14 extends generally around the exterior of the end walls 20 and 26 and over the side walls 22 and 24. As such, as will be described hereinafter, there is a funnel-shaped bottom of the container that has exterior surfaces exposed through the frame 14. During the course of international shipment, it is important to avoid closed spaces within such a container. As such, the exposure of the surfaces through the openings 32 at the bottom of the frame 14 will allow inspectors to have visual access to the areas adjacent to this funnel-shaped area.

Figure 2:
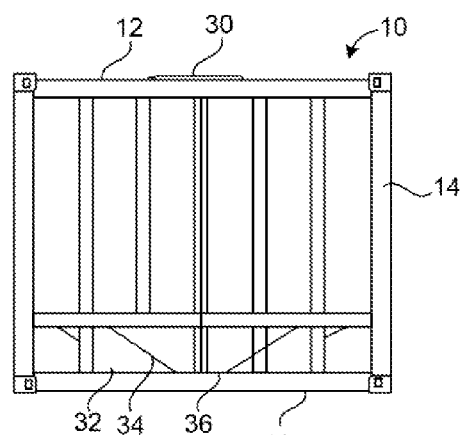
FIG. 2 is a side elevational view of the container in accordance with the preferred embodiment of the present invention.

As can be seen in FIG. 2, the container 10 is illustrated as having the top 16 and the bottom 18. The frame 14 provides structural support for the container 10 and generally surrounds the exterior of the container. The frame is formed of a plurality of vertical bars that extend so as to form a cage-like configuration around the walls 20, 22, 24 and 26. The bottom 18 is generally of a planar shape so that the bottom 18 can be placed upon the support structure (to be described hereinafter). Importantly, the area 32 shows that the funnel-shaped portion 34 is exposed through the openings of the frame 14. As such, there will be no closed or sealed areas within the interior of the container 10. The hatch 30 is positioned over the inlet 28 at the top 16 of the container 10. As a result, the proppant can be introduced through the inlet 28 when the hatch 30 is opened so as to fill the interior volume of the container 10. The funnel-shaped area 34 defines an outlet 36 located at the bottom 18 of the container 10.

As can be seen in FIGS. 1 and 2, the container 10 is a ten-foot ISO container. In accordance with standard ISO terminology, this means that the container has a length of ten feet, a width of eight feet and a height of 8.5 feet. The height can also be 9.5 feet. This configuration allows between 43,000 and 48,000 pounds of proppant to be introduced into the interior volume of the container.

Figure 3:
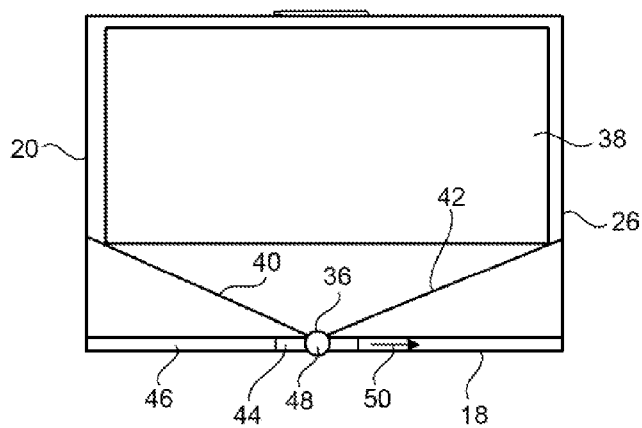
FIG. 3 is a cross-sectional view showing the container of the preferred embodiment of the present invention.

FIG. 3 shows a partial cross-sectional view of the container 10. It can be seen that the container 10 has an interior volume 38. The outlet 36 is formed adjacent to the bottom 18 of the container 10. A first ramp 40 will extend from the end wall 20 to the outlet 36. A second ramp 42 will extend from the end wall 22 to the outlet 36. The ramps 40 and 42 will serve to funnel the proppant that is retained within the interior volume 38 of the container 10 toward the outlet 36. Importantly, a gate 44 is positioned within a track 46 located at the bottom 18 of the container 10. The gate 44 is in the nature of flat plate which, as shown in FIG. 3, covers the outlet 36. The gate 44 includes a pin 48 (in the nature of king bolt) that extends outwardly from the gate 44. When an actuator is connected to the pin 48, it can move the gate 44 from the position closing the outlet 36 to a position opening the outlet 36. Arrow 50 shows the movement of the gate 44 between these positions. Since the gate 44 has a width that generally corresponds to the size of the outlet 36, the gate 44 will only need to move for a small amount of travel so as to move the gate 44 to the open position.

Figure 4:
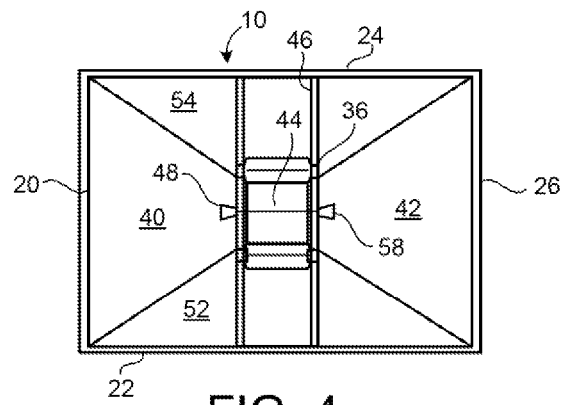
FIG. 4 is a plan view showing the interior of the container of the preferred embodiment of the present invention.

FIG. 4 is an interior view of the container 10. As can be seen, the first ramp 40 will extend from the end wall 20 to the outlet 36. The second ramp 42 extends from the end wall 26 to the outlet 36. A third ramp 52 will extend from the side wall 22 to the outlet 36. Another ramp 54 will extend from the side wall 24 to the outlet 36. As such, the ramps 40, 42, 52 and 54 form the funnel-like shape so that the proppant that is received within the interior volume 38 of the container 10 can flow free downwardly toward the outlet 36.

In FIG. 4, it can be seen that the gate 44 is positioned within the track 46. FIG. 4 shows the gate 44 in its closed position. An actuator can be used so as to move the gate 44 from the position shown in FIG. 4 in a direction toward either the side wall 22 or the side wall 24. Pins 48 and 58 are illustrated as extending outwardly of the sides of the gate 44. As such, a suitable actuator, such as a hydraulic piston-and-cylinder arrangement, can be connected to these pins 48 and/or 50 so as to achieve the requisite movement of the gate 44 from the closed position to the open position.

Figure 5:
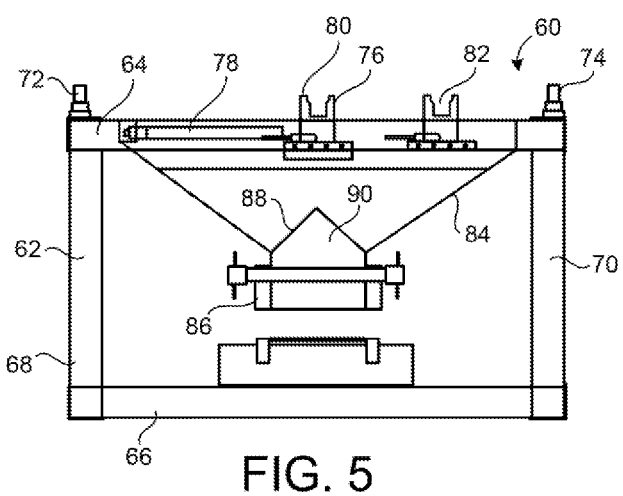
FIG. 5 is an isolated end view showing the support structure of the system of the preferred embodiment of the present invention.

FIG. 5 is an end view showing the support structure 60 as used in the proppant discharge system of the present invention. The support structure 60 has a frame 62 which forms a top surface 64, a bottom surface 66, and sides 68 and 70. The top 64 of the frame 62 has a surface upon which the container 10 can be placed. Suitable pin connections 72 and 74 extend upwardly from the top surface 64 so as to engage corresponding receptacles on the container 10. These pins 72 and 74 can be utilized so as to assure that the container 10 is properly positioned upon the support structure 60.

A receptacle 76 is positioned at or adjacent to the top surface 64. The actuator 78 is affixed to the frame 62 and extends to the receptacle 76. As can be seen, the receptacle 76 has a slot formed in the top end thereof. The slot of the receptacle 76 is suitable for receiving one of the pins 48 and 58 of the gate 44 of the container 10. Once the receptacle 76 receives the pin 48 therein, the actuator 78 can be actuated so as to move the receptacle (and its received pin) from the first position 80 to a second position 82. When the receptacle 82 (along with the pin received therein) is moved to the second position 82, the gate 44 will be opened so that the proppant can be discharged through the outlet 36 of the container 10. Since pins 48 and 58 are symmetrically placed, and since the container 10 is rather symmetrical, the support structure 60 is particularly adapted to the variety of orientations with the container 10 can be placed upon the top surface 64.

In FIG. 5, it can be seen that there is a hopper 84 that is positioned below the top surface 64. Hopper 84 serves to receive a portion of the proppant as discharged through the outlet 36 of the container 10 when the gate 44 is in the open position. As such, the hopper 84 can be utilized so as to properly meter the proppant onto the conveyor 86. Conveyor 86 is located below the opening 88 of the hopper 84.

As can be seen in FIG. 5, hopper 84 has an opening 88 of a generally inverted V-shaped configuration. There is a metering gate 90 that is mated with the opening 88 and also has a V-shaped configuration. The metering gate 90 can be moved a small distance so as to allow for the selected and controlled discharge of proppant from the hopper 84 onto the conveyor 86.

Figure 6:
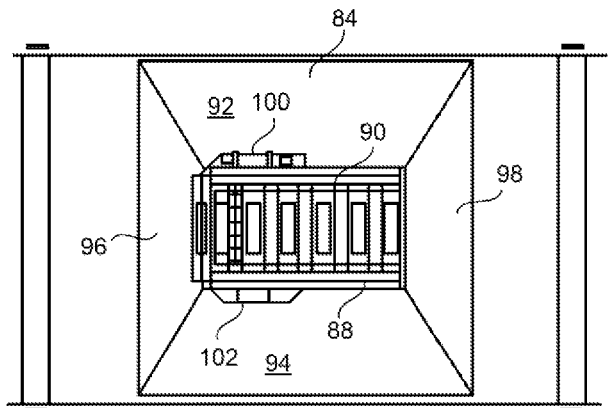
FIG. 6 is a plan view of the support structure of the system of the present invention.

FIG. 6 shows the interior of the hopper 84. Hopper 84 includes side walls 92 and 94 and end walls 96 and 98. The walls 92, 94, 96 and 98 are formed into a funnel-like shape so as to move the proppant downwardly toward the metering gate 90. In FIG. 6, it can be seen that the opening 88 of the hopper 84 has a plurality of slots formed therein. Similarly, the metering gate 90 has a plurality of slots formed therethrough. The structures between the slots is solid. As such, when the slots of the metering gate 90 are aligned with the slots of the opening 88, then proppant can be discharged onto the underlying conveyor 86. A small movement of the metering gate 90 in one direction or another, will block the flow of the proppant through the slots of the opening 88 of hopper 84.

As such, very small actuators 100 and 102 can be used so as to achieve the proper metering of the proppant onto the conveyor. If a small flow rate of proppant is desired, then the actuators 100 and 102 will move the metering gate 90 only a small distance. If a greater flow rate is required, then the actuators 100 and 102 will move the metering gate 90 so that the slots of the metering gate 90 fully correspond with the slots of the opening 88 so as to achieve a maximum flow of proppant from the hopper 84 down to the conveyor.

Figure 7:
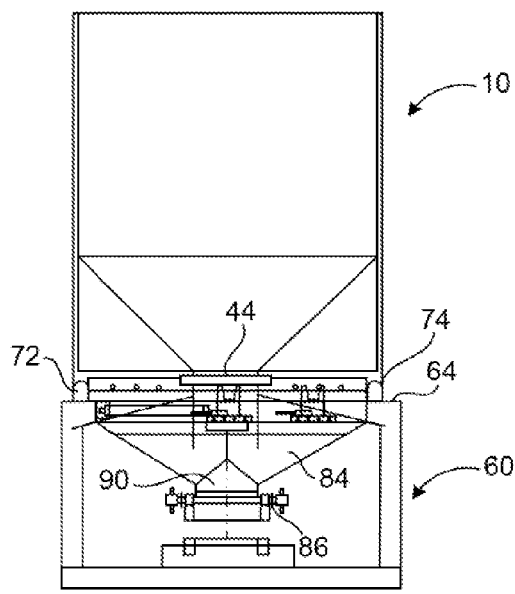
FIG. 7 is an end view showing the placement of the container upon the support structure in accordance with the preferred embodiment of the system of the present invention.

FIG. 7 shows the container 10 as placed upon the top surface 64 of the support structure 60. In normal use, a forklift can be utilized so as to properly position the container 10 in a proper position upon the pins 72 and 74 of the support structure 60. Initially, the gate 44 of the container 10 will be closed. Additionally, the metering gate 90 can also be closed. When the container 10 is properly positioned, the gate 44 can be moved to an open position so that the proppant is discharged into the hopper 84. The hopper 84 can then be filled with proppant. When it is desired to move the proppant from the hopper 84, along the conveyor, to the desired destination, then the metering gate 90 can be opened so as to achieve the desired flow rate of proppant through the opening 88 of the hopper 84.

Figure 8:
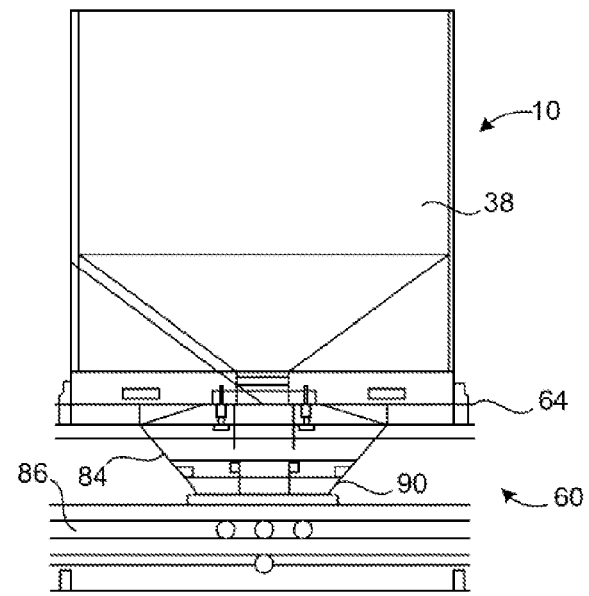
FIG. 8 is a side view of the container as place on the support structure in accordance with the preferred embodiment of the system of the present invention.

FIG. 8 shows a side view in which the container 10 is placed upon the top surface 64 of the support structure 60. The conveyor 86 is illustrated as extending longitudinally. As such, when the proppant passes through the metering gate 90 associated with the hopper 84, any proppant within the interior volume 38 of the container 10 can be delivered, in a controlled manner, onto the conveyor.

Figure 9:
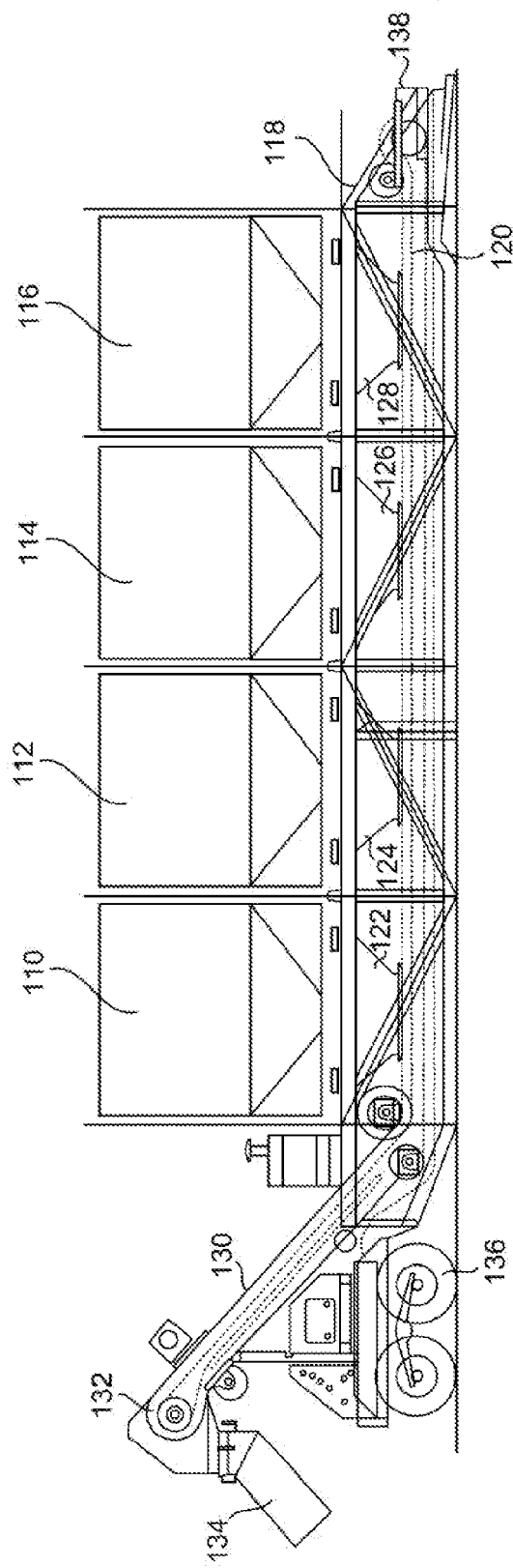
FIG. 9 is a side elevational view showing a plurality of containers as placed upon the support structure in accordance with the system of the preferred embodiment of the present invention.

FIG. 9 is an illustration of containers 110, 112, 114 and 116 as placed upon the support structure 118. The support structure 118 has a sufficient length so as to accommodate the containers 110, 112, 114 and 116. It can be seen that the conveyor 120 is arranged beneath the top surface of the support structure 118 and below the respective hoppers 122, 124, 126 and 128 below the respective containers 110, 112, 114 and 116. The conveyor 120 is an endless conveyor that is suitably wound around sheaves and idlers so as to travel a desired path. The proppant that is discharged from the containers 110, 112, 114 and 116 is discharged onto the conveyor 120 so as to travel therealong and along upwardly extending section 130. The end 132 of the conveyor 120 will open to a chute 134. The chute 134 can be directed toward the desired purposes at the fracturing site. As such, the array of containers 110, 112, 114 and 116 can be configured so as to replace existing storage facilities at the fracturing site. The support structure 118, along with the conveyor 120, can be easily transportable by a truck upon a roadway because of the use of the wheels 136. The forward end 138 can be suitably connected to a truck so as to allow for the easy transport of the system of the present invention.

Figure 10:
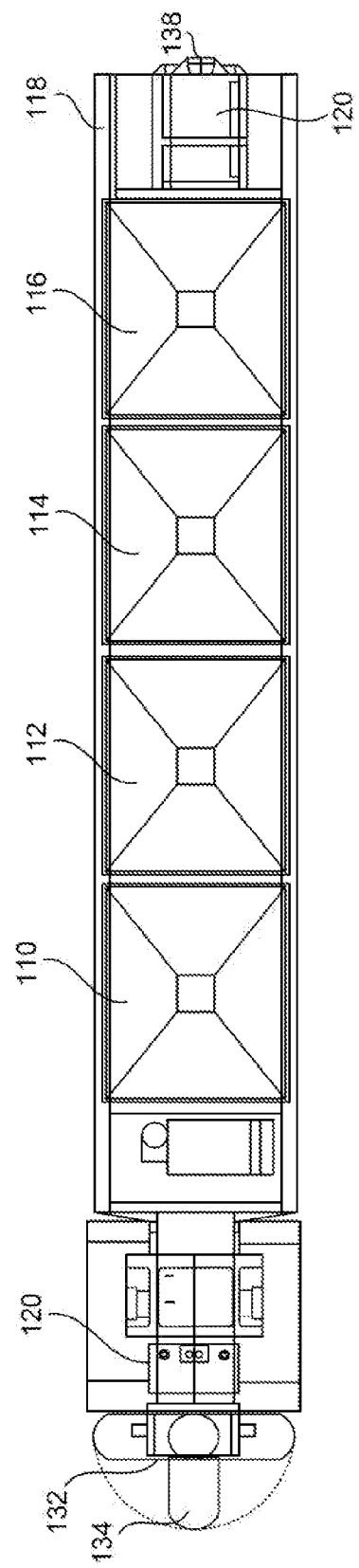
FIG. 10 is a plan view showing a plurality of containers as placed upon the support structure in accordance with the preferred embodiment of the system of the present invention.

FIG. 10 illustrates the placement of the containers 110, 112, 114 and 116 upon the support structure 118. The end 138 includes a suitable hitch connection for attachment to a truck. The conveyor 120 extends below the containers 110, 112, 114 and 116 so as to deliver the proppant to the chute 134. FIG. 10 illustrates that the chute 134 is suitably pivotable in cooperation with the end 132 of the conveyor 120 so as to allow for the controlled, and directed discharge of the proppant to the desired location.

The container 10 of the present invention is manufactured as a single unit. The gate 44 of the container 10 is specifically engineered to align with the actuator 70 located on the conveying system. The actuator is hydraulically controlled and accepts the pin 48 which is attached to the gate 44. When the actuator 70 is activated, the gate 44 moves horizontally so as to allow for the discharge of proppant therefrom.

The container of the present invention can be specifically applied for transport via rail. In particular, the railcar can be designed so as to accommodate up to four containers 10. As such, the railcar can carry approximately 180,000 pounds of proppant when the four containers are placed on the railcar. The railcar can be similar to current inter-modal railcars that carry twenty foot, forty foot and fifty-three foot inter-modal containers. The railcar would include typical inter-modal load-locks which are evenly spaced down to chassis of the railcar. The container should be constructed of materials wide enough to keep the overall loaded weight of the container under currently regulated railroad weight guidelines. Additionally, it must be strong enough to bear the load of the loaded container. This development allows sand mines to load proppant directly into a container 10 in order to speed up the loading process. It also eliminates the need to build a silo storage at the mine site. Once the container arrives at its designated location or region, trans-load processes to pneumatic trailers, silos or flat storage, are thus eliminated.

The present invention is an improved delivery system that can be used at the well-site. The support structure 60 includes a fabricated steel frame upon which multiple containers can be positioned. The containers lock into receptacles that secure the containers to the frame. The container will then sit above a conveying system that delivers the proppant from the container as the gate is opened to a master-conveying belt. The cradle is outfitted with a hydraulic system which can control the opening and closing of the gates. The containers of the present invention can be combined as an attachment or cartridge compatible with existing devices known as SAND KINGS™, SAND CHIEFS™ and SAND DRAGONS™. By replacing existing hoppers on these devices with the removable containers of the present invention, even greater efficiencies can be attained in the proppant delivery process.

The conveying system of the present invention is an alternative method of delivering proppant from the container to the blender belt for the mixing unit once delivered to the well-site. The conveying system of the present invention provides all of the functionality commonly seen in the SAND MASTER™, SAND KING™, SAND DRAGON™, SAND MOVE™, etc. As such, the present invention allows the flow of sand to be metered onto the conveyor belt through a hydraulic system of flow gates. The container is first lifted into position onto the support structure. The bottom flow gate is received by the receptacle of the hydraulic actuator so as to create a lock between the pin of the gate and the hydraulic system. The hydraulic system then opens the flow gate and the proppant so as to gravity-feed into a hopper located on the support structure. Another set of flow gates associated with the hopper system are then opened by way of another hydraulic system. This allows the proppant to be metered and to flow onto a conveyor belt. The conveyor belt can then deliver the proppant to the blender or the T-Belt. The proppant can then be mixed with other materials in the blender.

Currently, expensive pneumatic bulk trucks are utilized in the delivery of proppant to a well-site. Once on-site, the trucker employs a power take-off unit to "blow" the sand into the sand storage devices. This deli very often takes over one (1) hour to complete. By delivering sand to the well in the ten-foot containers of the present invention, the use of expensive pieces of specialized equipment are eliminated. The container can ride on a standard flatbed, step-deck, low-boy, or other more commonly-used trailer. As such, the process of the present invention is able to tap into a much larger universe of available trucking capacity. This can reduce the transportation costs to the well. While pneumatic trailer deliveries are priced in "round trip" miles, the delivery of the container of the present invention by a more common piece of equipment (capable of getting a "back-haul") significantly reduces the overall transportation cost. As an example, there is a great need for parts, tools and other wellhead equipment to be taken off the well-site for repair or return to a manufacturer or rental company. The flatbed trailer, now empty, has the ability to accept that load while it is on-site rather than calling in another trucking company to provide that service. The reduced need for "hot-shot" service is another significant value to the service company and ultimately the exploration and production company.

In terms of returning empty containers to the sand distribution facilities, a total of four (4) empty containers can be returned by a single flatbed trailer. This provides a 4:1 level of efficiency in removing the containers from the well-site. Additionally, a forty foot container chassis will be used in the movement of both empty and full containers. The support structure, just like the containers, can be delivered to the well-site by a typical flatbed truck. The support structure could be towed via truck to the site in manner similar to any other trailer.

Another important advantage to the present invention is the small footprint that the ten-foot ISO containers of the present invention occupy relative to the capacity of sand that they can store. When the containers are stacked three high, the containers can store approximately 135,000 pounds in a footprint of eighty square feet. The available space at the wellhead, and in potential proppant trans-loading facilities, can be extremely limited. As such, the process of the present invention minimizes the footprint that is required for a given amount of proppant at such a location.

Since environmental and safety concerns surrounding well-site operations is becoming an increasing concern, the present invention minimizes the amount of particulate matter that is released into the air. Proppant is currently delivered to the frac site via pneumatic trailers. Pneumatic pressure is used to pressurize the trailer and then "blow" the material into a sand storage unit. This process creates an immense amount of particulate matter than can then be inhaled by personnel at the frac-site. Additionally, while blowing the sand into the sand storage facility, the sand storage facility must vent the pressurized air to the atmosphere. This creates an even greater exposure to particulate matter. The constant need to take delivery of proppant on-site creates a constant environment of dust and small particles in the air. Since the present invention eliminates pneumatic deliveries, the process of the present invention significantly reduces the amount of particulate matter on the frac-site. The gravity-feed delivery method from the container to the blender greatly improves the safety of well-site personnel.

The present invention also serves to reduce trucking emissions by reducing the amount of trucks that are being used or waiting. The safety at the wellhead is improved by reducing such truck traffic.

The foregoing disclosure and description of the invention is illustrative and explanatory thereof. Various changes in the details of the illustrated construction, or in the steps of the described method, can be made within the scope of the present invention without departing from the true spirit of the invention. The present invention should only be limited by the following claims and their legal equivalents.

We claim:

1. A proppant discharge system comprising:
    a container having a bottom and a pair of sidewalls and a pair of end walls and a top, said container having an inlet formed at or adjacent to said top, said container having an outlet formed at said bottom, said container having a gate slidably affixed at said outlet so as to be horizontally movable between a first position covering said outlet and a second position opening said outlet, said gate having a pin fixedly affixed thereto, said pin extending outwardly of said gate; and a support structure having a top surface and an actuator, said container being removably positioned on said top surface of said support structure, said actuator having a receptacle, said actuator for moving said receptacle horizontally adjacent said top surface of said support structure, said pin of said gate engageable with said receptacle when said container is positioned on said top surface of said support structure, said actuator for moving said gate from said first position to said second position.

2. The proppant discharge system of claim 1, further comprising:

a conveyor underlying said top surface of said support structure so as to receive proppant as discharged from said container through said outlet of said container.

3. The proppant discharge system of claim 2, further comprising:

a hopper positioned on said support structure below said top surface thereof, said hopper positioned directly below said gate of said container, said hopper having an opening at a bottom thereof, said bottom of said hopper positioned above said conveyor.

4. The proppant discharge system of claim 3, further comprising:

a metering gate positioned adjacent said opening at said bottom of said hopper, said metering gate being movable between a closed position and an open position.

5. The proppant discharge system of claim 2, further comprising:

a frame affixed to said conveyor and extending therealong; and a discharge chute cooperative with one end of said conveyor so as to discharge the proppant from said conveyor to a desired location.

6. A proppant discharge system comprising:

a container having a bottom and a pair of sidewalls and a pair of end walls and a top, said container having an inlet formed at or adjacent to said top, said container having an outlet formed at said bottom, said container having a gate slidably affixed at said outlet so to be movable between a first position covering said outlet and a second position opening said outlet;

a support structure having a top surface and at least one actuator, the container being removably positioned on said top surface of said support structure, the actuator being engageable with said gate so as to move said gate from said first position to said second position, said actuator having a receptacle, said actuator for moving said receptacle horizontally adjacent said top surface of said support structure, said gate being engageable with said receptacle when said container is positioned on said top surface of said support structure, said actuator for moving said gate from said first position to said second position;

a hopper positioned on said support structure below said top surface thereof, said hopper positioned directly below said gate of said container, said hopper having an opening at a bottom thereof, said bottom of said hopper positioned above said conveyor; and a metering gate positioned adjacent said opening at said bottom of said hopper, said metering gate being movable between a closed position and an open position, said opening of said bottom of said hopper having a plurality of slots formed therein, said metering gate having a plurality of slots formed therethrough, said plurality of slots of said metering gate being at least partially aligned with said plurality of slots of said hopper when said metering gate is in said open position.

7. The proppant discharge system of claim 6, further comprising:

an actuator affixed to said metering gate so as to move said metering gate between said closed position and said open position.

8. The proppant discharge system of claim 7, further comprising:

a plurality of wheels rotatably mounted to said frame so as to allow said conveyor to be transported to a desired location.

9. A proppant discharge system comprising:

a container having a bottom and a pair of sidewalls and a pair of end walls and a top, said container having an inlet formed at or adjacent to said top, said container having an outlet formed at said bottom, said container having a gate slidably affixed at said outlet so to be movable between a first position covering said outlet and a second position opening said outlet;

a support structure having a top surface and at least one actuator, the container being removably positioned on said top surface of said support structure, the actuator being engageable with said gate so as to move said gate from said first position to said second position, said actuator having a receptacle, said actuator for moving said receptacle horizontally adjacent said top surface of said support structure, said gate being engageable with said receptacle when said container is positioned on said top surface of said support structure, said actuator for moving said gate from said first position to said second position;

a hopper positioned on said support structure below said top surface thereof, said hopper positioned directly below said gate of said container, said hopper having an opening at a bottom thereof, said bottom of said hopper positioned above said conveyor; and a metering gate positioned adjacent said opening at said bottom of said hopper, said metering gate being movable between a closed position and an open position, said opening at said bottom of said hopper having an inverted V-shaped configuration, said metering gate having an inverted V-shaped configuration mating with said opening at said bottom of said hopper, said metering gate slidable horizontally relative to said opening at said bottom of said hopper.

* * * * *

UNITED STATES PATENT AND TRADEMARK OFFICE
CERTIFICATE OF CORRECTION

| | | |
|---|---|---|
| PATENT NO. | : 8,585,341 B1 | Page 1 of 1 |
| APPLICATION NO. | : 13/660866 | |
| DATED | : November 19, 2013 | |
| INVENTOR(S) | : John Oren and Joshua Oren | |

It is certified that error appears in the above-identified patent and that said Letters Patent is hereby corrected as shown below:

On the Title Page, Item (63) should read

(63)  Continuation of application No. 13/628,702, filed on Sep. 27, 2012, which is a continuation-in-part of application No. 13/555,635, filed on Jul. 23, 2012.

Signed and Sealed this
Twenty-ninth Day of March, 2016

Michelle K. Lee
*Director of the United States Patent and Trademark Office*